United States Patent [19]

Chou

[11] 3,917,644

[45] Nov. 4, 1975

[54] AZETIDINESULFENIC ACIDS

[75] Inventor: Ta-Sen Chou, Indianapolis, Ind.

[73] Assignee: Eli Lilly and Company, Indianapolis, Ind.

[22] Filed: Aug. 3, 1973

[21] Appl. No.: 385,369

[52] U.S. Cl. ............................... 260/326 S; 260/326
[51] Int. Cl.² ........................................ C07D 209/34
[58] Field of Search .................................. 260/326 S

[56] References Cited
UNITED STATES PATENTS 3,433,784  3/1969  Long et al. ...................... 260/239.1
3,843,682  10/1974 Kukolja ............................... 260/326

OTHER PUBLICATIONS

J.A.C.S., Vol. 92, No. 8, (1970), pp. 2575–2576 relied on.

Primary Examiner—Elbert L. Roberts
Attorney, Agent, or Firm—William C. Martens, Jr.; Everet F. Smith

[57] ABSTRACT

Compounds of the formula

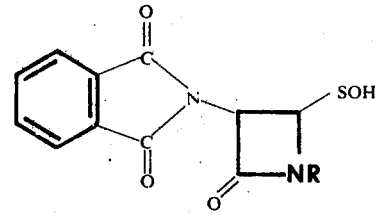

in which R is

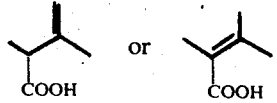

These compounds exhibit antibacterial activity.

9 Claims, No Drawings

AZETIDINESULFENIC ACIDS

BACKGROUND OF THE INVENTION

The cephalosporin antibiotics have recently achieved considerable success as therapeutic agents for the treatment of infectious diseases of man.

One of the methods by which the cephalosporin antibiotics are produced involves the chemical conversion of a penicillin. This method was invented by Morin and Jackson (U.S. Pat. No. 3,275,626) who describe and claim a process for converting a penicillin sulfoxide ester to a desacetoxycephalosporin ester. Subsequently, improvements were made upon this Morin-Jackson process. Robin D. G. Cooper found that the use of certain tertiary carboxamide solvents (British Pat. No. 1,204,972) or certain tertiary sulfonamide solvents (British Pat. No. 1,204,394) directed the heat rearrangement of the penicillin sulfoxide esters more specifically toward production of the corresponding desacetoxycephalosporin esters and permitted the use of lower temperatures. Hatfield (U.S. Pat. No. 3,591,585) improved upon the Cooper contributions by finding that the conversion of a penicillin sulfoxide ester to a desacetoxycephalosporin ester by heating under acid conditions in the presence of a tertiary carboxamide solvent can be further improved by carrying out the reaction in the presence of both a sulfonic acid and a means for removing or inactivating water present in the reaction mixture.

The mechanism which is postulated in U.S. Pat. No. 3,275,626 for the conversion of the penicillin sulfoxide ester to a desacetoxycephalosporin ester is by formation of a sulfenic acid involving scission of the S-C$_2$ bond. This mechanism has now been conclusively established, and it furthermore has been shown (R. D. G. Cooper, J. A. C. S., 92, [1970], pp. 5010–5011) that under the conditions of reaction, a thermal equilibrium between the sulfoxide starting material and the sulfenic acid intermediate is established.

The sulfenic acid has been postulated as a fleeting and unstable intermediate. Upon formation from the penicillin sulfoxide starting material, the sulfenic acid principally either reverts to the original penicillin sulfoxide or is directed to the desired desacetoxycephalosporin. The sulfenic acid never has been isolated intact from the ring expansion reaction mixture, and no way has been recognized by which it could be isolated. It has been considered to be a rapidly fleeting reaction intermediate.

Recently, it has been discovered that it is possible to trap the sulfenic acid intermediate during ring expansion of the penicillin sulfoxide by conversion of the fleeting sulfenic acid to its corresponding silyl ester (T. S. Chou, U.S. application Ser. No. 349,876 filed Apr. 12, 1973, and continuation-in-part of U.S. application Ser. No. 252,078 filed May 10, 1972). This is achieved by heating the penicillin sulfoxide in the presence of a silylating agent which reacts with the sulfenic acid intermediate to produce a stable silyl ester azetidine-2-sulfenate. The stable silyl ester, upon treatment with acid, then can be ring closed to the desired desacetoxycephalosporin compound. In producing the stable silyl ester intermediate, the carboxyl function of the penicillin sulfoxide which is employed either can be a free carboxyl or one which is protected by an appropriate carboxy protecting group. This differs from the Morin-Jackson process of U.S. Pat. No. 3,275,626 which required the carboxyl of the penicillin sulfoxide to be suitably protected. In those instances in which the carboxyl function is a free carboxyl group, the resulting silyl ester intermediate additionally will be appropriately silylated at carboxyl function in the 3-position.

It now has been discovered that it is possible to convert a silyl ester intermediate containing a silyl function both at the sulfenic acid moiety and at the carboxyl moiety into a recoverable free carboxyl, free sulfenic acid compound. This has been accomplished using, as the starting penicillin sulfoxide, 6-phthalimido-2,2-dimethylpenam-1-oxide-3-carboxylic acid. Two novel sulfenic acid products are available, and both possess antibacterial activity. It is to a process for producing these compounds and to the compounds themselves that this invention is directed.

SUMMARY OF THE INVENTION

This invention is directed to a compound of the formula

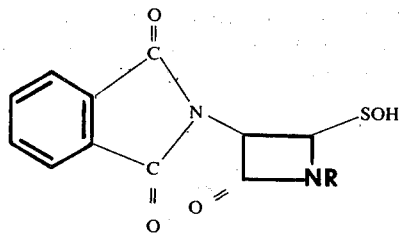

in which R is

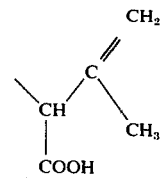

or

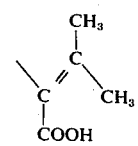

Another aspect of the invention is a process for preparing a compound of the formula

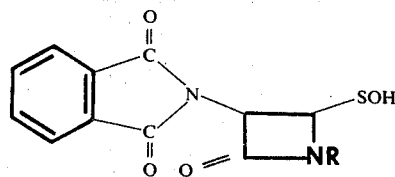

in which R is as defined hereinabove, which comprises reacting a silyl ester compound of the formula

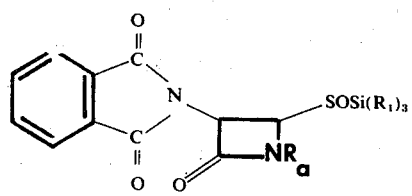

in which $R_a$ is

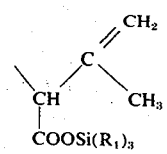

or

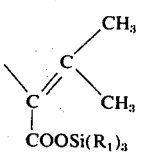

and $R_1$ is $C_1$-$C_4$ alkyl or phenyl, with water or an alcohol.

DETAILED DESCRIPTION OF THE INVENTION

The compounds of this invention are 3-phthalimido-1-(1'-carboxy-2'-methylprop-2'-enyl)-4-oxo-2-azetidinesulfenic acid and 3-phthalimido-1-(1'-carboxy-2'-methylprop-1'-enyl)-4-oxo-2-azetidinesulfenic acid. These compounds are prepared by the mild hydrolysis of the corresponding silyl esters.

Both of the aforementioned compounds have as their ultimate source 6-phthalimido-2,2-dimethylpenam-1-oxide-3-carboxylic acid. This penicillin sulfoxide can be ring opened to the silyl ester, and the corresponding silyl ester can then be converted to the compounds of this invention. The structural difference between the two compounds resides in the position of the double bond. Ring opening of the penicillin sulfoxide results in the formation of a 4-oxo-2-azetidinesulfenic acid moiety having in the 1-position a 1-substituted-2-methylprop-2-enyl residue (terminal double bond). Under mildly alkaline conditions, the external double bond can be isomerized to an internal position resulting in a 4-oxo-2-azetidinesulfenic acid having a 1-substitued-2-methylprop-1-enyl residue in the 1-position, or the structure containing an internal double bond can be obtained directly from the penicillin sulfoxide by inclusion in the reaction mixture during ring opening of a small amount of base, for example, a tertiary amine. Both of these compounds exhibit antibacterial activity.

The following sequence illustrates the preparation of the compounds of this invention.

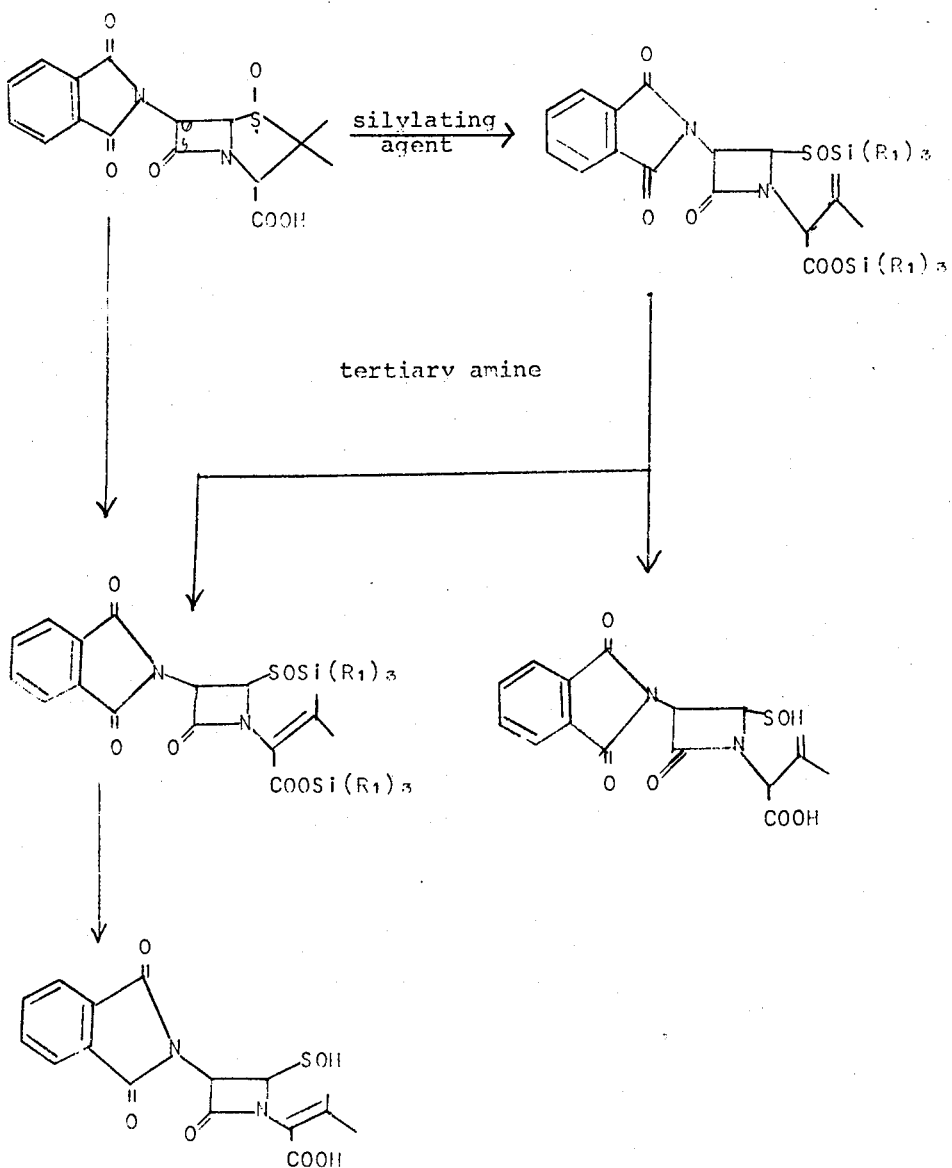

The conversion of the penicillin sulfoxide is accomplished by heating the sulfoxide with a selected silylating agent to a temperature of from about 75°C. to about 150°C. The heating of the sulfoxide is carried out in the presence of an appropriate inert, substantially anhydrous solvent. Any solvent can be employed which is inert to the penicillin sulfoxide and to the silylating agent and which has a sufficiently elevated boiling point to achieve the necessary reaction temperature. Suitable such solvents include benzene, toluene, ethyl acetate, acetonitrile, dioxane, N,N-dimethylformamide, N,N-dimethylacetamide, and the like. Mixtures of such appropriate solvents can also be employed.

The reaction mixture containing the penicillin sulfoxide is heated in the presence of a silylating agent at a temperature within the above range for a period necessary to effect conversion. This period can be very short or somewhat longer depending upon the reactants which are employed. Generally, the mixture will be heated for a period of from about 0.5 hours to about 24 hours. It is believed that the application of heat to the sulfoxide accomplishes a scission of the sulfur-$C_2$ bond. The scission of the sulfur-$C_2$ bond gives rise to a sulfenic acid type intermediate which is susceptible to attack by the silylating agent. The attack by the silylating agent produces a stable silyl ester. Since, in accordance with this invention, the penicillin sulfoxide which is employed contains a free carboxyl function in the 3-position, the silylating agent will attack the sulfenic acid intermediate at two places, namely, at the sulfenic acid moiety and at the free carboxyl moiety. One silyl moiety is required for each sulfenic acid moiety and for each carboxyl moiety. Therefore, a two molar ratio of the silylating agent to the penicillin sulfoxide will be required unless the particular silylating agent which is employed is structured so as to generate two or more silyl moieties per molecule. In this latter instance, a correspondingly lesser molar quantity of the silylating agent can be employed. Generally, an excess of from about 1.1 to about 4 equivalents of the silylating agent will be employed per equivalent of the total reactive sites present in the penicillin sulfoxide.

In preparing the silyl ester intermediate useful in this invention, any silylating agent can be employed which will achieve the silylation of the sulfenic acid formed by thermal cleavage of the penicillin sulfoxide. Any such silylating agent will contain at least one moiety having the formula $-Si(R_1)_3$ in which $R_1$ is $C_1$-$C_4$ alkyl or phenyl, and, furthermore, such moiety will be so situated in the silylating agent molecule as to be readily cleavable therefrom under the conditions of reaction and thereby available for forming the azetidine-2-sulfenate silyl ester. Mixtures of silylating agents can likewise be employed. Preferably, any mixture of silylating agents will be such that each silylating agent will give rise to the same silyl protecting group. Preferred silylating agents include those having the following formulae:

a

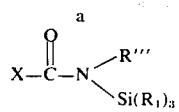

in which each $R_1$ independently is $C_1$-$C_4$ alkyl or phenyl, $R'''$ is hydrogen, $C_1$-$C_4$ alkyl, or phenyl, and X is

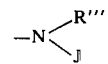

in which J is hydrogen or $-Si(R_1)_3$, or X is $-CW_3$ in which each W independently is hydrogen, trifluoromethyl, or $C_1$-$C_3$ alkyl;

b

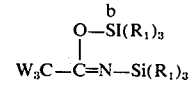

in which $R_1$ and W are as herein defined; and c.

$Z$-$Si(R_1)_3$ in which $R_1$ is as herein defined and Z is halogen, $C_2$-$C_3$ alkenyloxy, $C_1$-$C_3$ alkyl $-SO_3-$, $-O-Si(R_1)_3$, $-S-Si(R_1)_3$, or

in which $R_5$ is hydrogen or $C_1$-$C_3$ alkyl, and $R_6$ is $C_1$-$C_4$ alkyl or $-Si(R_1)_3$, or $R_5$ and $R_6$ taken together with the nitrogen atom to which they are bonded from a heterocyclic ring having 5 or 6 atoms, up to 3 of which, in addition to the already-defined nitrogen atom, independently are nitrogen, sulfur, or oxygen.

Of the above preferred silylating agents, it is more preferred that $R_1$ defined therein is phenyl or, taken from the $C_1$ to $C_4$ alkyl definition, methyl. Most preferably, $R_1$ is methyl.

Typical examples of the silylating agents which can be employed in the process of this invention include: N,O-bis(trimethylsilyl)acetamide, N,O-bis(triethylsilyl)acetamide, N,O-bis(triphenylsilyl)-acetamide N,O-bis(trimethylsilyl)trifluoroacetamide, N,O-bis(tripropylsilyl)-trifluoroacetamide, N,O-bis(triphenylsilyl)trifluoroacetamide, N-trimethylsilylacetamide, N-tributytlsilylacetamide, N-triphenylsilylacetamide, N-methyl-N-trimethylsilylacetamide, N-ethyl-N-triethylsilylacetamide, N-methyl-N-triphenylsilylacetamide, N-trimethylsilyl-N,N'-diphenylurea, N-triethylsilyl-N,N'-diphenylurea, N-ttriphenylsilyl-N,N'-diphenylurea, propenoxytrimethylsilane, ethanoxytriethylsilane, propenoxytriphenylsilane, trimethylsilyl methane sulfonate, tripropylsilyl ethane sulfonate, triphenylsilyl propane sulfonate, trimethylchlorosilane, triethylchlorosilane, triphenylchlorosilane, hexamethyldisilazane, hexaethyldisilazane, hexaphenyldisilazane, N-trimethylsilyl-t-butylamine, N-tripropylsilyl-t-butylamine, N-triphenylsilyl-t-butyl-amine, N-trimethylsilyldiethylamine, N-triethylsilyldimethylamine, N-triphenylsilylmethylethylamine, N-trimethylsilylimidazole, N-triethylsilylimidazole, N-triphenylsilylimidazole, hexamethyldisiloxane, hexapropyldisiloxane, hexaphenyldisiloxane, hexamethyldisilthiane, hexaethyldisilthiane, hexaphenyldisilthiane, and the like.

In preparing the silyl ester from the penicillin sulfoxide, any of the aforementioned silylating agents can be employed. However, strongly alkaline conditions must be avoided, or cleavage of the β-lactam ring will occur. Therefore, special precautions must be observed in those instances in which a silazane is employed as silylating agent. Since the use of a silazane results in the concomitant production of ammonia during silylation, care must be exercised to assure the immediate neutralization of at least the greatest portion of the ammonia thus produced. This can be accomplished by including in the reaction mixture a minor amount of an acid which will inactivate the ammonia upon its generation. A like result can be achieved by employing a combination of the silazane and a halosilane as silylating agent. The halosilane will generate a hydrogen halide as by-product of the silyl ester formation, and the hydrogen halide, in turn, will scavenge the ammonia generated from the silazane. As is pointed out in more detail hereinafter, if a minor amount of the generated ammonia is permitted to remain intact, isomerization of the double bond from the external to the internal position will occur, albeit without accompanying destruction of the β-lactam ring.

Conversely, care must be exercised in employing a halosilane as silylating agent. Since a hydrogen halide is formed during such silylation, the acidic conditions thereby developed may cause ring closure to the desacetoxycephalosporin in accordance with the process defined in the Morin-Jackson U.S. Pat. No. 3,275,626. In order to avoid this possibility, it is preferred to employ a mixture of silylating agents containing a sufficient amount of a silazane to neutralize by ammonia formation the hydrogen halide which forms.

The silyl ester either can be isolated from the silylation reaction mixture and then be treated to achieve cleavage of the silyl function and formation of the free sulfenic acid compound of this invention, or the reaction mixture containing the silyl ester can itself be subjected to such treatment.

The silyl ester so produced will, under normal reaction conditions, have a terminal double bond. The product can be isomerized to its corresponding internal double bond compound by subjecting the product to alkaline conditions. The internal double bond silyl ester can be produced directly from the penicillin sulfoxide during silylation by including in the reaction mixture a reagent which will contribute alkalinity to the mixture or by addition of such a reagent to the reaction mixture. It can also be accomplished by using, for example, a combination of a silazane and a halosilane as silylating agent in which the silazane is present in a slight excess, sufficient to generate in situ during silylation a minor amount of ammonia. Isomerization can also be readily achieved by using a commercial grade bis-trimethylsilylacetamide as silylating agent since this reagent generally contains minor amounts of triethylamine as impurity. Of course, the terminal double bond silyl ester compound can be specifically prepared, isolated, and then subjected to alkaline treatment to accomplish isomerization to the internal double bond silyl ester compound.

Alkaline reagents which are preferred for isomerization purposes include tertiary amines which have a $pK_a$ in water of from about 4 to about 10. The tertiary amines can be aliphatic, cycloaliphatic, aromatic, or heterocyclic, and include, for example, triethylamine, diisopropylethylamine, 1,5-diazobicyclo [4,3,0]non-5-ene, N-methylmorpholine, pyridine, picoline, N,N-dimethylaniline, quinoline, and the like.

Preferred tertiary amines are trialkyl amines in which each alkyl group has from 1 to 4 carbon atoms. Typical such tertiary amines include triethylamine, dipropylethylamine, dimethylethylamine, methyldiethylamine tripropylamine tributylamine. dimethylbutylamine, and the like. Most preferably, triethylamine is employed as tertiary amine.

The conversion of the 2-methylprop-2-enyl silyl ester compound to the 2-methylprop-1-enyl isomer is readily accomplished simply by subjecting the former to alkaline conditions. Only catalytic quantities of the alkaline reagent are necessary to accomplish isomerization, although greater quantities of the alkaline reagent can be employed. The important factor is that the reagent be sufficiently alkaline to accomplish isomerization, but not so alkaline that it also causes destruction of the azetidinone (β-lactam) ring. As mentioned, the alkaline reagent can be added to the reaction mixture during silylation or can be specifically brought into contact with the 2-methylprop-2-enyl silyl ester compound by dissolving the two together in a suitable inert solvent.

Conversion of the silyl ester (whether the 2-methyl prop-2-enyl compound or the 2-methylprop-1-enyl compound) to the free sulfenic acid is accomplished by treatment of the silyl ester with water or with an alcohol. Preferably, the alcohol is a $C_1$-$C_4$ alkanol or $C_2$-$C_3$ diol. Typical such alcohols include, for example, methanol, ethanol, n-propyl alcohol, isopropyl alcohol, n-butyl alcohol, isobutyl alcohol, t-butyl alcohol, ethylene glycol, propylene glycol, 1,3-propanediol, and the like.

The silyl ester compounds are highly sensitive to the action of water or an alcohol and are rapidly converted to the corresponding free sulfenic acid, free carboxylic acid derivative. For example, conversion results by subjecting the silyl ester to an environment containing small but sufficient quantities of moisture. Specifically, this conversion to the free sulfenic acid, free carboxylic acid structure can be accomplished by dissolving the silyl ester in an appropriate inert solvent and stirring the resulting solution in the presence of moist air. Thus, the free sulfenic acid, carboxylic acid compounds of this invention are very readily produced from their corresponding silyl esters.

The temperature of this conversion is generally from about -20°C. to about +5°C. with higher or lower temperatures also being available. Lower temperatures of reaction may correspondingly lengthen the reaction time.

An appropriate inert solvent, that is, one which is not acidic or basic, generally will be employed; however, such is not essential and is employed only for the purpose of achieving better contact with the water or alcohol.

The reaction of the silyl ester with the water or alcohol requires the availability of at least one hydrogen per silyl function. Thus, if the water or alcohol reagent is such that it has only one available hydrogen per molecule, at least two moles of the reagent are necessary per mole of the silyl ester since the latter contains two silyl functions per molecule. Of course, if the reagent is, for example, a glycol, two hydrogens per molecule are available, and a corresponding lesser amount of the reagent is thus required Nevertheless, it is important only that sufficient reagent be used to accomplish displacement of each silyl function. A large excess of the reagent can be present without experiencing any adverse effects therefrom.

The compounds of this invention exhibit antibacterial activity. Specifically, antibacterial activity is indicated against a group of gram-positive bacteria, for example, *Bacillus subtilis, Sarcina lutea, Mycobacterium avium, Staphylococcus aureus, Serratia marcescens*, and *Pseudomanas solanacearum*.

The compounds of this invention can be used as antibacterial drugs for treating infections, especially by the aforementioned microorganisms, as additives for preserving foodstuffs or as disinfectants, for use, for example, in hospitals, and the like.

The following examples are provided to illustrate the teaching of this invention and are not intended to be limiting upon the scope thereof.

EXAMPLE 1

A mixture of 1.10 g. (3 millimoles) of 6p-phthalimido-2,2-dimethylpenam-1-oxide-3-carboxylic acid (vacuum-dried), 0.78 ml. (6 millimoles) of trimethylchlorosilane, and 0.63 ml. (6 millimoles) of hexamethyldisilazane in 10 ml. of dry benzene was prepared. Moisture was kept from the system by means of a drying tube containing calcium chloride, and the mixture was warmed to about 40°C. during which the penicillin sulfoxide dissolved. The mixture then was refluxed for about 6 hours and evaporated in vacuo at 50°C. to an almost colorless gum residue of trimethylsilyl 3-phthalimido-4-oxo-1-(1'-trimethylsilyloxycarbonyl-2'-methylprop-2'-enyl)azetidine-2-sulfenate.

Analysis, Calc. for $C_{21}H_{29}N_2O_6Si_2S$: C, 52.15; H, 5.97; N, 5.28; S, 6.32.

Found: C, 51.91; H, 5.71; N, 5.28; S, 6.41 $[\alpha]_D^{27}$ –45.5° (Benzene). NMR (CDCl$_3$) δ0.05 (s, 9H), 0.37 (s, 9H), 2.05 (s, 3H), 5.01 (s, 1H), 5.15 (d, 2H, J = 5), 5.84 (bs, 2H), and 7.84 (m, 4H). IR (CHCl$_3$) 3010, 1800, 1740, 1400, and 854 cm$^{-1}$.

The sulfenate silyl ester was dissolved in sufficient cold chloroform to make a 2–3 percent solution thereof. The solution was cooled and stirred in the cold overnight in contact with moist air. The mixture was then evaporated to dryness in vacuo to give a light yellow gum indicated by NMR analysis to be 3-phthalimido-1-(1'-carboxy-2'-methylprop- 2'-enyl)-4-oxo-2-azetidinesulfenic acid. pK$_a$ (66 percent N,N-dimethylformamide and 34 percent water) 5.0 and 7.0 $[\alpha]_D$ –105.2° [50:50 benzene:ethanol, c 5.48 mg/ml.].

EXAMPLE 2

A mixture of 1.10 g. (3 millimoles) of 6-phthalimido-2,2-dimethylpenam-1-oxide-3-carboxylic acid (vacuum dried), 1.50 ml. (about 6 millimoles) of N,O-bis(-trimethylsilyl)acetamide (contaminated with a minor amount of triethylamine) in 10 ml. of dry benzene was prepared. Moisture was kept from the system by means of a drying tube containing calcium chloride, and the mixture was refluxed at about 83°C. for about 6 hours. The mixture was then evaporated to dryness in vacuo. In vacuo treatment was continued over the weekend during which time some acetamide sublimed but most of the acetamide remained in the mixture. In vacuo separation was continued overnight at about 50°C., and a yellow semi-powder was obtained. The powder was shown by NMR to be trimethylsilyl 3-phthalimido-4-oxo-1-(1'-trimethylsilyloxycarbonyl-2'-methylprop-1'-enyl)-azetidine-2-sulfenate.

NMR (CDCl$_3$) δ0.05 (s, 9H), 0.37 (s, 9H), 2.22 (s, 3H), 2.30 (s, 3H), 5.78 (s, 2H), and 7.80 (m, 4H). IR (CHCl$_3$) 3020, 1796, 1750, 1400, 1265, and 850 cm$^{-1}$.

The sulfenate silyl ester was dissolved in cold chloroform sufficient to produce a 2-3 percent solution thereof. The solution was cooled and stirred in the cold overnight in contact with moist air. The mixture was then evaporated to dryness in vacuo to produce 3-phthalimido-1-(1'-carboxy-2'-methylprop-1'-enyl)-4-oxo-2-azetidinesulfenic acid as a light yellow gum. pK$_a$ (66 percent N,N-dimethylformamide and 34 percent water) 5.6 and 7.5; $[\alpha]_D$ +6.4°(50:50 benzene:ethanol, c 1.57 mg./ml.).

NMR (CDCl$_3$-trifluoroacetic acid): δ2.25 (d, 6H, J = 2.5), 5.80 (s, 2H), 7.54 (s, 1H), 7.85 (m, 4H), and 11.53 (bs, 1H). IR (CHCl$_3$): 3500 ~ 3120, 1785, 1730, and 1390 cm$^{-1}$.

EXAMPLE 3

A mixture of 2.20 g. (6 millimoles) of 6-phthalimido-2,2-dimethylpenam-1-oxide-3-carboxylic acid vacuum-dried), 1.56 ml. (12 millimoles) of trimethylchlorosilane, and 1.26 ml. (12 millimoles) of hexamethyldisilazane in 20 ml. of dry benzene was prepared. Moisture was kept from the system by means of a drying tube containing calcium chloride, and the mixture was refluxed for about 5 hours during which time ammonium chloride formed as a suspension in the reaction mixture and collected in the condenser of the reaction equipment. The mixture was then cooled to room temperature, filtered, and evaporated to a transparent gum shown by NMR to be trimethylsilyl 3-phthalimido-4-oxo-1-(1'-trimethylsilyloxycarbonyl-2'-methylprop-2'-enyl)azetidine-2-sulfenate.

The sulfenate silyl ester was dissolved in anhydrous benzene, and about 20 microliters of triethylamine were added. The mixture was stirred at room temperature for about 4 hours. The reaction mixture was then evaporated to dryness in vacuo to give a light yellow gum shown by NMR to be trimethylsilyl 3-phthalimido-4-oxo-1-(1'-trimethylsilyloxycarbonyl-2'-methylprop-1'-enyl)azetidine-2-sulfenate containing some corresponding free sulfenic acid, free carboxylic acid compound.

EXAMPLE 4

A mixture of 1.10 g. (3 millimoles) of 6-phthalimido-2,2-dimethylpenam-1-oxide-3-carboxylic acid (vacuum-dried), 0.39 ml. (3 millimoles) of trimethylchlorosilane, 0.95 ml. (6 millimoles) of hexamethyldisilazane, and 0.02 ml. of triethylamine in 20 ml. of dry benzene was prepared. Moisture was kept from the system by means of a drying tube containing calcium chloride, and the mixture was refluxed for about 4 hours. The mixture was then evaporated to dryness in vacuo to obtain as a yellow powder, trimethylsilyl 3-phthalimido-4-oxo-1-(1'-trimethylsilyloxycarbonyl-2'-methylprop-1'-enyl)- azetidine-2-sulfenate.

NMR δCPCl$_3$): 0.5 (s, 9H), 0.37 (s, 9H), 2.22 (s, 3H), 2.30 (s, 3H), 5.78 (s, 2H), and 7.80 (m, 4H).

The sulfenic acid compound of this invention were evaluated for antibacterial activity in a test employing the Bauer-Kirby disc diffusion method. The compounds were tested at a concentration of approximately 0.15 mg./disc. The results, expressed as the diameter in millimeters of the zone of inhibition, are specified in the Table following. In the Table, I refers to 3-phthalimido-1-(1'-carboxy-2'-methylprop-2'-enyl)-

4-oxo-2-azetidinesulfenic acid and II refers to 3-phthalimido-1-(1'-carboxy-2'-methylprop-1'-enyl)-4-oxo-2-azetidinesulfenic acid.

Table

| Organism | I | II |
| --- | --- | --- |
| Staphylococcus aureus | 29 | 29 |
| Bacillus subtilis | 23 | 22 |
| Sarcina lutea | 22 | 20 |
| Mycobacterium avium | Tr. | Tr. |
| Sacharomyces pastorianum | — | — |
| Neurospora crassa | — | — |
| Candida albicans | — | — |
| Fusarium moniliforme | Tr. | Tr. |
| Trichophyton mentagraphytes | — | — |
| Proteus vulgaris | Tr. | — |
| Salmonella gallinarum | — | — |
| Escherichia coli | Tr. | — |
| Pseudomonas aeroginosa | — | — |
| Klebsiella pneumoniae | — | — |
| Serratia marcescens | 11 | 9 |
| Pseudomonas solanacearum | 18 | 18 |

I claim:

1. A compound of the formula in which R is

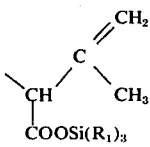

or

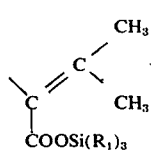

2. Compound of claim 1, in which R is

3. Compound of claim 1, in which R is

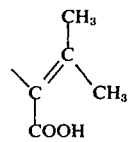

4. Process for preparing a compound of claim 1, which comprises reacting a silyl ester compound of the formula

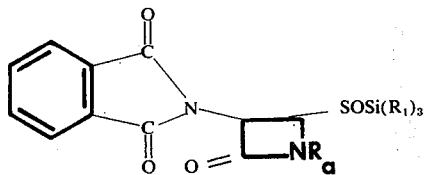

in which $R_a$ is or and $R_1$ is $C_1$-$C_4$ alkyl or phenyl, with water or an alcohol selected from the group consisting of a $C_1$-$C_4$ alkanol and a $C_2$-$C_3$ diol.

5. Process of claim 4, in which the silyl ester is reacted at a temperature of from about −20°C. to about +5°C.

6. Process of claim 5, in which $R_1$ is methyl.

7. Process of claim 6, in which the silyl ester is reacted with water.

8. Process of claim 7, in which the silyl ester is brought into contact with moist air.

9. Process of claim 6, in which the silyl ester is reacted with an alcohol.

* * * * *